US008281401B2

(12) United States Patent
Pennington et al.

(10) Patent No.: US 8,281,401 B2
(45) Date of Patent: Oct. 2, 2012

(54) SYSTEM FOR DETECTING VULNERABILITIES IN WEB APPLICATIONS USING CLIENT-SIDE APPLICATION INTERFACES

(75) Inventors: Bill Pennington, San Jose, CA (US); Jeremiah Grossman, San Jose, CA (US); Robert Stone, Mountain View, CA (US); Siamak Pazirandeh, Santa Clara, CA (US)

(73) Assignee: Whitehat Security, Inc., Santa Clara, CA (US)

( * ) Notice: Subject to any disclaimer, the term of this patent is extended or adjusted under 35 U.S.C. 154(b) by 773 days.

(21) Appl. No.: 11/339,373

(22) Filed: Jan. 24, 2006

(65) Prior Publication Data

US 2006/0195588 A1    Aug. 31, 2006

Related U.S. Application Data

(60) Provisional application No. 60/647,181, filed on Jan. 25, 2005.

(51) Int. Cl.
*G06F 12/14* (2006.01)

(52) U.S. Cl. .......................................... 726/25; 713/194

(58) Field of Classification Search .................... 726/22, 726/24, 25, 26; 709/227, 229; 713/168, 713/189, 194
See application file for complete search history.

(56) References Cited

U.S. PATENT DOCUMENTS

| 6,584,569 | B2 * | 6/2003 | Reshef et al. ................... 726/25 |
| 6,996,845 | B1 * | 2/2006 | Hurst et al. ..................... 726/25 |
| 7,058,978 | B2 * | 6/2006 | Feuerstein et al. .............. 726/26 |
| 7,225,249 | B1 * | 5/2007 | Barry et al. .................... 709/227 |
| 7,236,034 | B2 * | 6/2007 | Chen et al. ..................... 327/273 |
| 7,392,545 | B1 * | 6/2008 | Weber et al. ..................... 726/25 |
| 8,060,486 | B2 * | 11/2011 | Chatterjee et al. ............. 707/705 |
| 2002/0083341 | A1 * | 6/2002 | Feuerstein et al. ............. 713/201 |
| 2002/0090934 | A1 * | 7/2002 | Mitchelmore ................. 455/412 |
| 2003/0120493 | A1 * | 6/2003 | Gupta .......................... 704/270.1 |
| 2003/0182305 | A1 * | 9/2003 | Balva et al. ............... 707/103 R |
| 2003/0204719 | A1 * | 10/2003 | Ben-Itzhak .................... 713/152 |
| 2003/0233581 | A1 * | 12/2003 | Reshef et al. ................. 713/201 |

(Continued)

OTHER PUBLICATIONS

Vigna et al, Testing network-based intrusion detection signatures using Mutant Exploits, ACM, Oct. 25, 2004, pp. 21-30.*

(Continued)

*Primary Examiner* — Eleni Shiferaw
*Assistant Examiner* — Abu Sholeman
(74) *Attorney, Agent, or Firm* — Kilpatrick Townsend & Stockton, LLP; Philip H. Albert (57) ABSTRACT

An improved method and apparatus for client-side web application analysis is provided. Client-side web application analysis involves determining and testing, using client-side application interfaces and the like, data input points and analyzing client requests and server responses. A security vulnerability analyzer can analyze web page content for client-side application files, such as Flash files and Java applets, extract web addresses and data parameters embedded in the client-side application file, and modify the data parameters according to user-defined test criteria. The modified data parameters are transmitted as part of a request to a respective web server used to service the client-side application files. The security vulnerability analyzer analyzes the response from the server to ascertain if there are any security vulnerabilities associated with the interface between the client-side application file and the web server.

24 Claims, 5 Drawing Sheets

U.S. PATENT DOCUMENTS

| | | | | |
|---|---|---|---|---|
| 2005/0138426 | A1* | 6/2005 | Styslinger | 713/201 |
| 2005/0138571 | A1* | 6/2005 | Keskar et al. | 715/789 |
| 2005/0188215 | A1* | 8/2005 | Shulman et al. | 713/188 |
| 2005/0246442 | A1* | 11/2005 | Gutjahr | 709/227 |
| 2006/0015722 | A1* | 1/2006 | Rowan et al. | 713/166 |
| 2006/0036644 | A1* | 2/2006 | Cheslow | 707/104.1 |
| 2006/0069671 | A1* | 3/2006 | Conley et al. | 707/3 |
| 2006/0259973 | A1* | 11/2006 | Sima et al. | 726/25 |

OTHER PUBLICATIONS

International Search Report dated Sep. 28, 2007 from PCT/US2006/03003, filed Jan. 26, 2006.

* cited by examiner

*FIG. 4A*  http://www.example.com

*FIG. 4B*
```
<html>
<object classid="clsid:D2" codebase="http://download.example.com/cabs/flash/swflash.cab">
<param value="path_to_flash_movie.swf"/>
<embed src="path_to_flash_movie.swf" type="application/x-shockwave-flash" pluginspage="http://www.macromedia.com/go/getflashplayer"></embed>
</object>
<applet code=path_to_applet.class>
<param name="ActualName1" value="ActualValue1">
</applet>
</html>
```
404

*FIG. 4C*  http://host/webapp.cgi?name=ActualValue
406

SYSTEM FOR DETECTING VULNERABILITIES IN WEB APPLICATIONS USING CLIENT-SIDE APPLICATION INTERFACES

CROSS-REFERENCES TO RELATED APPLICATIONS

This application claims priority to U.S. Provisional Patent Application No. 60/647,181, entitled "System For Detecting Vulnerabilities In Web Applications Using Client-Side Application Interfaces" filed Jan. 25, 2005, which is hereby incorporated in its entirety.

BACKGROUND

Millions of people worldwide bank, shop, purchase goods and services, perform research, etc. using the World Wide Web. With each transaction, private information, including names, addresses, phone numbers, credit card and debit card numbers, and passwords, are routinely transferred and stored in a variety of locations. Billions of dollars and millions of personal identities and private information are vulnerable to hackers who find their way through security vulnerabilities in web-applications.

One approach to identifying security vulnerabilities in a web application is to examine the code for the web application to identify risk-prone operations within the code. However, this might not provide a complete picture of vulnerabilities, as the execution structure of the code might not be apparent from reviewing the code and the interplay of the examined code and other parts of a web application might introduce other vulnerabilities. Additionally, while examined code might be secure, it is possible for an unauthorized client device to modify client-side code to do something other than what was intended by the web application. Therefore, web application testing should also involve testing the limits of what unauthorized client-side code could perform.

Difficulties with properly executing security scans of web applications from the client-side include being able to correctly determine the possible paths of interaction between a user and a client and the web application. Often, this is made difficult because the client is provided with code to execute that has varied points of entry to the web application that is not in a readily understood format. For example, if the client-side code comprises a webpage formatted with simple HyperText Markup Language (HTML), a reader or a computer program can easily determine all of the entry points of that code, such as the form fields and embedded URLs.

Therefore, what is needed is a system and method to detect security vulnerabilities in server based web applications using client-side applications that are simple to implement and cost effective.

BRIEF SUMMARY

Embodiments of the invention provide an improved method and apparatus for analyzing client-side web applications to reveal security vulnerabilities in server-side interfaces associated with client-side web applications. In one embodiment, a security vulnerability analyzer is employed to retrieve webpage content from a server in communication with the security vulnerability analyzer. The security vulnerability analyzer retrieves an application file, such as a Flash file (file extension .fla, .swf, and the like), referred to in the webpage content. The security vulnerability analyzer extracts web addresses and associated input data parameters embedded in the application files. The security vulnerability analyzer replaces the input data parameters with user-defined input criteria. A request along with the user-defined input criteria is transmitted to the servers referred to in the web addresses to invoke a response from the servers. The security vulnerability analyzer analyzes the server responses by matching the received responses against a plurality of pre-determined server responses that alone or in combination are indicative of server-side security vulnerabilities.

In one embodiment, the invention provides a method for analyzing security vulnerabilities in web-based applications. The method includes extracting path parameters and data parameters from the client-side applications referring to web servers servicing the client-side applications, modifying the path parameters or data parameters with user-defined data to generate test data, transmitting the test data to the web servers, and determining if any of responses received in response to the test data are indicative of security vulnerabilities.

In another embodiment, the invention provides a method of detecting security vulnerabilities in web-based applications. The method includes extracting data from client-side applications to locate data entry points to web servers used to service the client-side applications, and applying user-defined test criteria to the data entry points. The user-defined testing data is configured to cause a web server to respond with one or more predetermined responses configured to expose security vulnerabilities in client-server interfaces associated with the data input points.

In another embodiment, the invention provides a security analyzer for detecting security vulnerabilities in client-server interfaces. The security analyzer includes a security analyzer engine configured to extract client-server interface data embedded in client-side application files, and generate user-defined testing data from the client-server interface data. The user-defined testing data is configured to cause a web server to respond with one or more predetermined responses that are used to expose security vulnerabilities in client-server interfaces associated with the client-side application files.

Other embodiments of the invention are described in detail below.

DETAILED DESCRIPTION

Embodiments of the present invention provide a system and method to examine webpage content for locations to client-side application files. The paths and associated data parameters embedded in the client side application files are extracted and modified with user-defined test criteria. The modified paths and associated data parameters are transmitted to respective servers referenced in the extracted paths. Responses received from the servers are evaluated to determine if the paths and associated data parameters provide unauthorized network access through the client-side interface and therefore represent a security vulnerability risk.

Figure 1:
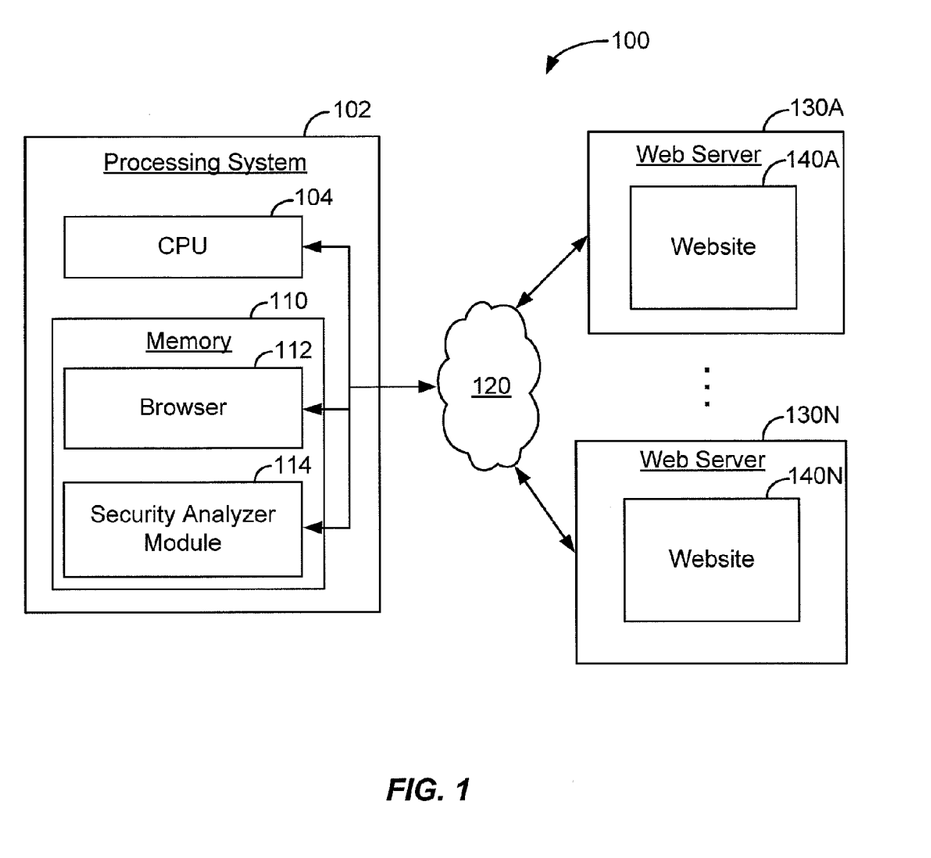
FIG. 1 is a high-level block diagram of a system for scanning webpage content and client-side applications to analyze security vulnerabilities in accordance with embodiments of the invention.

FIG. 1 is a high-level block diagram of a system 100 for analyzing webpage content and client-side application files to determine server-side security vulnerabilities. As shown, system 100 includes a processing system 102, a communication network 120, and one or more web servers 130A through 130N serving respective websites 140A though 140N, where "N" is a plurality. For clarity, server 130A and website 140A will be used in the following discussion.

Processing system 102 includes a central processing unit (CPU) 104 and memory 110. Memory 110 may include a browser 112, and security analyzer module 114. Memory 110 is preferably random access memory sufficiently large to hold the necessary programming and data structures required for the operation of processing system 102. While memory 110 is shown as a single entity, it should be understood that memory 110 may in fact comprise a plurality of modules, and that memory 110 may exist at multiple levels, from high speed registers and caches to lower speed but larger DRAM chips. In one embodiment, processing system 102 may interact with website 140A through communication network 120. Communication network 120 may be any network, such as the Internet, a local area network (LAN), a wide area network (WAN), a wireless network, a wire-line network, etc.

Website 140A may be stored on a storage device, such as web server 130A. In one embodiment, web server 130A is a computer that holds the files for one or more websites, such as website 140A. In some cases, website 140A may be split over a number of servers in different geographical locations. Website 140A may be any software application. Although website 140A is described, it will be understood that any software application may be analyzed. In one embodiment, website 140A is a collection of files. For example, website 140A may include a beginning file called a home page. This home page may be associated with an identifier, such as a universal resource locator (URL), such as http://www.example.com. The URL corresponds to a file that is being stored. From a home page, other pages may be accessed using links on the home page. The other pages may be associated with other URLs, such as www.example.com/login.html. A person of skill in the art will appreciate additional details regarding websites that are not described. Although the terms webpages and websites are used herein, it will be understood that these terms may include applications that are not web-based.

When a client, such as processing system 102, requests a webpage, web server 130A may use a file stored on the web server 130A in order to serve the webpage 140A to the client. The webpage 140A may then be displayed on an interface, such as web browser 112. Actions may then be performed with the webpage 140A. For example, items may be selected ("clicked") to request other webpages, text may be entered, forms may be filled, documents transferred, Flash files (file extension .fla or .swf) or java applet applications may be invoked, etc. Requests indicating these actions may be sent to one or more web servers 130A for further processing. For example, login information, such as a username and password, may be entered on a webpage in order to login to website 140A. In this case, a user may access a restricted webpage that is only accessible if the login information is entered. For example, a restricted webpage may show a user's personal email account information.

A protocol may be used in communications between browser 112 and web server 130A. In one embodiment, the HyperText Transfer Protocol (HTTP) is used. Using the example above, login information, such as a username and password, account number or related information, is entered in a webpage sent in a request. The login information may be any information that allows access to restricted parts of website 140A. The login information sent in the request may allow a user to login into website 130A. In one embodiment, in response to receiving the login information, credential information may be sent in a response from web server 130A. Credential information may be any information that may be needed to access the restricted parts of website 140A. The credential information may be stored and sent with future requests by a client that sent the request. For example, HTTP cookies, URL parameter schemes, or other HTTP headers may be used to retain the credential information for future requests.

In one embodiment, security analyzer module 114 enables the detection and assessment of security vulnerabilities associated with website 140A. As website 140A may have references to more than one web server, security vulnerabilities may be associated with a plurality of web servers 130A (e.g., web servers 130A-N). Security vulnerabilities include but are not limited to application specific vulnerabilities, which are security holes within the website's own specific application, and security vulnerabilities embedded in client-side application files, such as Flash files or Java applets, that may be associated with the website 140A, or other websites, and servers used to service the client-side application files. These security vulnerabilities arise from an application-level interface between the client and servers and include, but are not limited to, path vulnerabilities, parameter vulnerabilities, and the like.

In order to determine server-side security vulnerabilities associated with client-side application files, security analyzer module 114 may be configured to retrieve webpage contents of website 140A to obtain paths (e.g., web addresses) and data parameters associated with web servers 130A servicing instructions and content for the webpage page 140A. In one embodiment, security analyzer module 114 is capable of automatically extracting web addresses and data parameters embedded in client-side application files referred to in the webpage content. This enables the security analyzer module 114 to discover the structure or elements client-side application interface with the web servers 130A, particularly the path parameters and data parameters employed in the interface. Security analyzer module 114 is also capable of modifying the data extracted, transmitting the modified data and server request protocols to the respective web server 130A via communication network 120, and analyzing the response from the web server 130A in response to the modified data to determine server-side security vulnerabilities associated with the client-server interface.

For example, to discover server-side security vulnerabilities, security analyzer module 114 may be configured to retrieve and analyze webpage content of website 140A to locate client-side application files referred to in the webpage content. Security analyzer module 114 is configured to extract path parameters and associated data parameters from the client-side application files which refer to web servers used to service the client-side application files content and instructions thereof. In one embodiment, security analyzer module 114 modifies the path parameters and/or extracted data parameters with user-defined criteria to form test data, transmits the test data to the servers, and analyzes the server responses for server-side security vulnerabilities. Any security vulnerabilities found may be summarized and provided to a user in a security vulnerability assessment as described further below. Advantageously, security analyzer module 114 may be used to detect security vulnerabilities in the interface between clients and web servers before attackers gain access to personal information, such as user's credit card data and other personal information, by exploiting those security vulnerabilities.

While security analyzer module 114 is capable of performing the processes of parsing and analysis automatically, it is contemplated that a user of the security analyzer module 114 may manually modify the parsing and/or analysis functions to, for example, customize parsing and/or analysis for any portions of the client-side application files and data parameters that meet the needs of a given application. For example, the user may modify the parsing and/or analysis process to eliminate searching for unnecessary files, paths, and the like. Advantageously, providing the user with the ability to manually modify the parsing and/or analysis processes provided by security analyzer module 114 may allow security analyzer module 114 to locate security vulnerabilities more quickly and efficiently.

Figure 2:
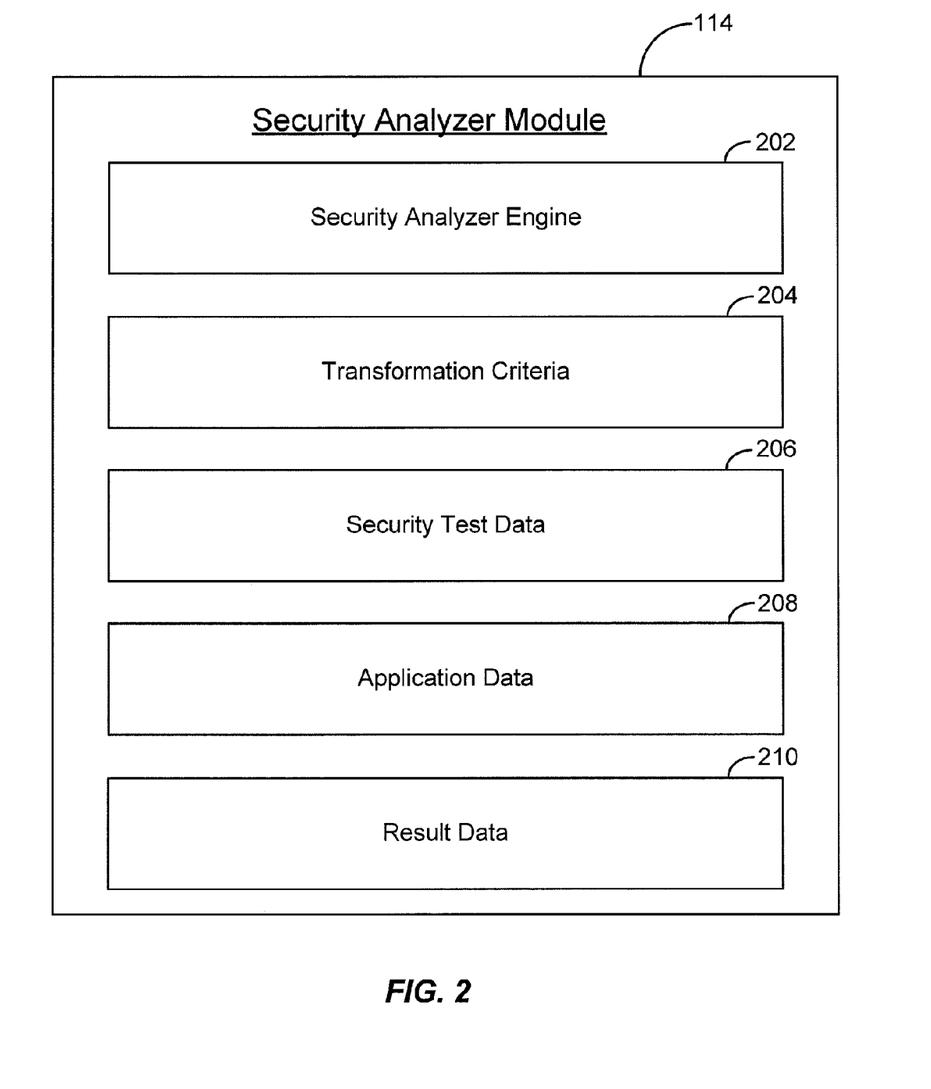
FIG. 2 is a high-level block diagram of a security analyzer software module in accordance with embodiments of the invention.

FIG. 2 is a high-level block diagram of one embodiment of security analyzer module 114. Security analyzer module 114 includes a security analyzer engine 202, user-defined transformation criteria 204, security test data structure 206, application data structure 208, and result data structure 210. In one embodiment, security analyzer engine 202 may operate as a proxy as known in the art for controlling communication between web server 130A and processing system 100. Security analyzer engine 202 may also be configured to control the validation of requests transmitted from the processing system 100 and web server 130A, for example, using the credential information.

In one embodiment, security analyzer engine 202 is a software module capable of manually or automatically assessing server-side security vulnerabilities using data embedded in client-side applications. Security analyzer engine 202 may be configured to parse webpage content and client-side application files, such as Flash files, to discover URLs, data parameters, and the like. The client-side application files may be developed in any one of a vast option of languages (such as Flash, Perl, PHP, Java, C++, and the like) and may use one or more integration methods (CGIs, servlets, server APIs, etc.). The data parameters are used to call, initiate or trigger various functions, actions or logic of the servers servicing the client-side applications. Each such parameter may have a number of attributes such as data type, length, visibility, and value.

Once the embedded data has been extracted, security analyzer engine 202 modifies the path parameters and/or data parameters found, transmits requests to the discovered URLs with the modified paths and/or parameters, analyzes the results of the responses, or lack thereof, from the respective web servers, and ranks the results. Such results may then be used to determine the security vulnerability of the server interface servicing the client-side application. A more detailed description of the processing steps carried out by security analyzer engine 202 is described further below with respect to FIGS. 3-5.

Transformation criteria 204 includes a plurality of user-defined data such as alphanumeric characters, symbols, and the like that when transmitted to a server 130A, may, or may not, invoke a response from the server. For example, transformation criteria 204 may include a text character such as an apostrophe, a numeric character such as "1", an algorithm such as "1=1", a symbol, and the like. Such transformation criteria 204 when processed by a server 130A as part of a request message, may invoke an error message, may invoke no-response, or may invoke an unexpected response from the server 130A that may lead a user to discern security vulnerabilities, as described further below.

Transformation criteria 204 may be derived manually or automatically. In one embodiment, transformation criteria 204 is derived empirically from the user's observations of security vulnerabilities with respect to, for example, user experimentation. In other embodiments, transformation criteria 204 may be derived automatically, using one or more algorithms. In one embodiment, such algorithms employed may generate patterns of data that invoke patterns of web server responses. Such patterns may be used to detect security vulnerabilities.

Security test data 206 includes data associated with the process of server-side security vulnerability testing. For example, in one embodiment, security test data 206 may include the webpage content, server requests, web addresses extracted from the client-side applications, modified parameters, modified cookies, modified javascript, modified applet parameters, modified database parameters, and the like.

Application data 208 may include client-side application files referred to in the webpage being analyzed (e.g., webpage 140A). Examples of client-side applications may include, but are not limited to, Sun Microsystems' Java Applets code, Macromedia's Flash Movies applications, XUL, and Microsoft's ActiveX Controls code. These types of applications provide an alternative application programming interface to web server 130A that may be separate from the typical HTML and Javascript interfaces.

Results data structure 210 includes results associated with the process of server-side security vulnerability testing. For example, results data 210 may include errors and messages received from servers in response to the transformation criteria 204, a listing of security issues, a user-defined relationship between errors and transformation criteria 204, reports, security assessments, and the like.

Figure 3:
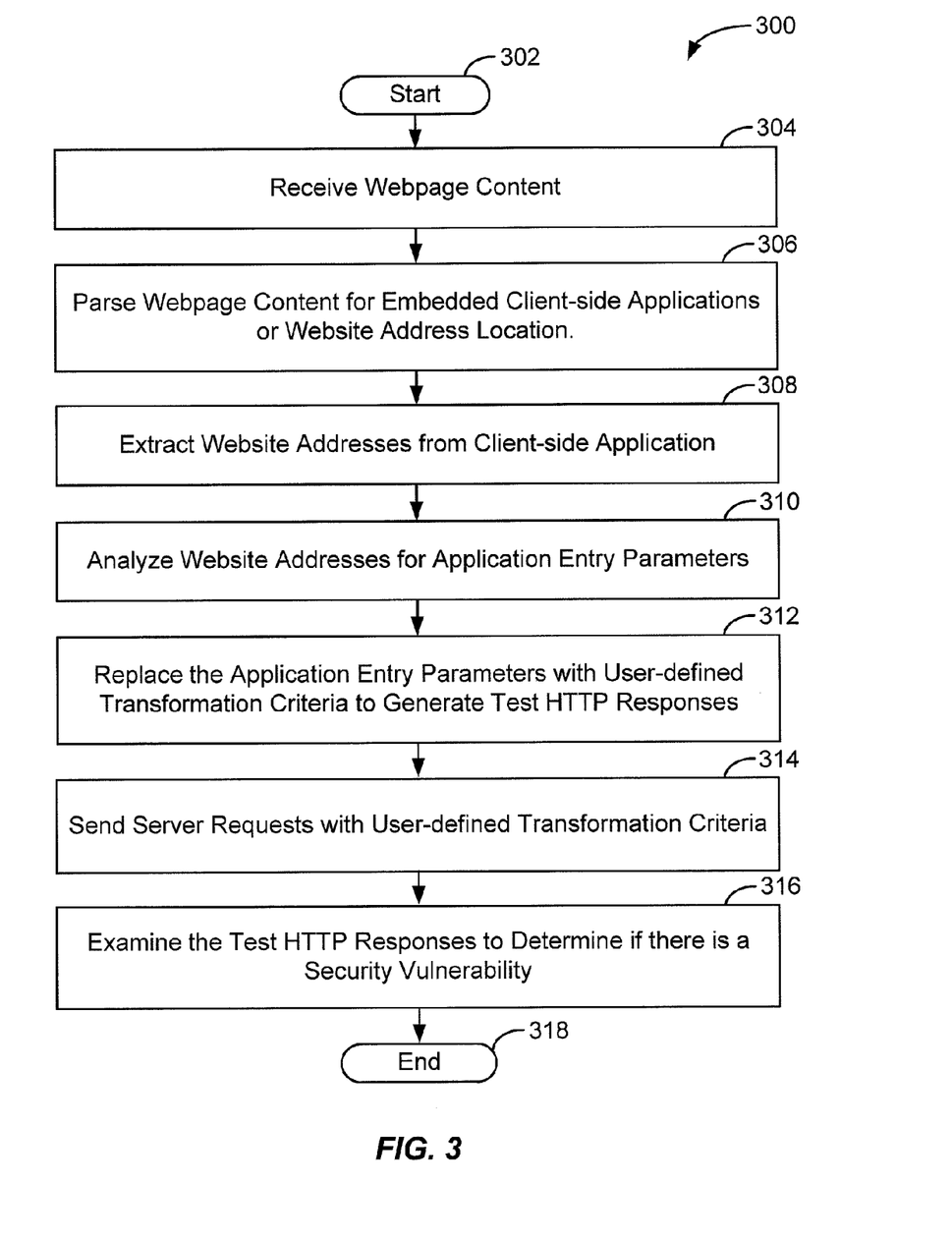
FIG. 3 is flow diagram illustrating a method of assessing web application security vulnerabilities in accordance with embodiments of the invention.
Figure 4A:
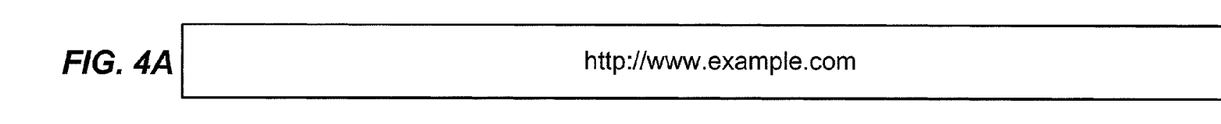
FIGS. 4A-C illustrate an example of a webpage content which includes URL and data parameters extracted from a client-side application file referred to in the webpage content in accordance with embodiments of the invention.

FIG. 3 is a flow diagram illustrating a method 300 of assessing web application security vulnerabilities. In one embodiment, method 300 is initiated at step 302 when, for example, processing system 102 is used to analyze a webpage for client side security vulnerabilities. At step 304, webpage content is received by security analyzer engine 202 for processing. For example, as illustrated in FIG. 4A, a webpage content requested from URL "http://www.example.com" is located and stored in security test data structure 206 for processing by security analyzer engine 202.

Figure 4B:
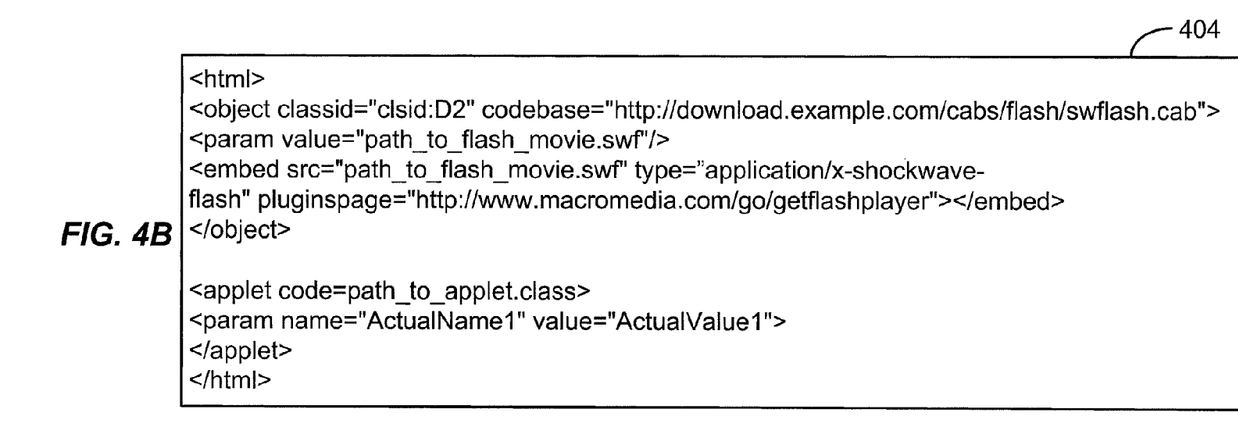

Depending on the type of client-side application, different techniques may be employed to identify the available URLs contained within the client-side application. For example, at step 306, security analyzer engine 202 parses the contents to locate references (e.g., paths) to client-side applications such as Java applets, Flash files, and the like. For example, FIG. 4B illustrates the content 404 of webpage "www.example.com" having references to a Flash file location "path_to_flash_movie.swf." and an applet with references to an applet file path_to_applet.class.

In one embodiment, a user may modify the parsing step to tailor the parsing to a particular need. For example, the user may modify the parsing process to eliminate searching for image files such as GIF, JPEG, BMP, and the like. In other embodiments, the user may modify the parsing step to search for references to specific file types such as Flash applications, Applet applications, and other types of client-side application files. Advantageously, providing the user with the ability to modify the parsing step allows security analyzer engine 202 to parse the webpage content more quickly to help a user locate security vulnerabilities more quickly and efficiently.

At step 308, security analyzer engine 202 retrieves the client-side application files discovered during parsing and stores them, for example, in application data structure 208. Security analyzer engine 202 extracts path parameters and associated data parameters from the client-side application files. In one embodiment, security analyzer engine 202 parses the client-side application to extract the path parameters and associated data parameters from the client-side application files using a variety of methodologies. This may be done when, for example, security analyzer engine 202 is configured to search through the client-side application file for the path parameters and associated data parameters. For example, to parse the client-side application file, the security analyzer engine 202 may use the file format of the client-side application file published, for example, by the vendor of the client-side application. In other embodiments, the format may be learned through reverse engineering procedures. Alternatively, the security analyzer engine 202 may analyze the client-side application file code, which may be encoded in various formats, to identify data matching the standard structure of path and data parameters.

In one embodiment, security analyzer engine 202 employs binary analysis to find path parameters and associated data parameters from the client-side application files. For example, path parameters and associated data parameters may be part of an ASCII string in a binary file. Once located, security analyzer engine 202 searches the strings for indications of path parameters and associated data parameters within the strings. For example, the string may include path parameters such as "http", "/", www, and the like.

In another embodiment, security analyzer engine 202 employs run-time monitoring to derive path parameters and associated data parameters. In this embodiment, a client-side application file is activated in a "sandbox" environment to simulate the execution process of a client-side application in a controlled environment. Sandboxing refers to a process of activating the client-side application file in an isolated environment and monitoring its operation. In the sandbox environment, upon execution the client-side application file may attempt to make outbound HTTP requests. If the client-side application attempts to remotely connect, security analyzer engine 202 captures path parameters and associated data parameters from such HTTP requests sent, for example, from processing system 102 to web server 140A, via network 120. The captured path parameters and associated data parameters may be stored, for example, in security test data structure 206, for real-time or later analysis.

At step 310, once the path parameters and associated data parameters are determined, the next step is to analyze messages that flow or would flow between a client and a web server in order to discover data input points of the web application interface with external clients. Examples include links, forms, fixed fields, hidden fields, menu options, etc. The security analyzer engine 202 may send an HTTP request derived from each of the path parameters (e.g., URL) identified in the previous step and receive the associated responses from the web server 130A. The web server responses can then be analyzed to discover the various URLs and data input points contained within the website and web applications.

Figure 4C:
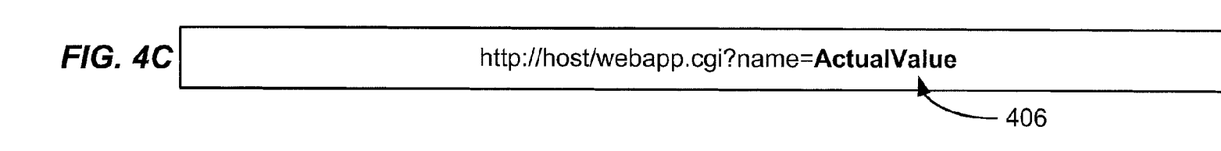

Web applications interface with clients using a multitude of data parameters that may be data input points. Security analyzer engine 202 may employ a variety of techniques to discover such data input points. In one embodiment, for well understood URL structures which usually exhibit a well known format with a query string "?name1=value1&name2=value2", security analyzer engine 202 may parse the URL string to extract "value1" and "value2". For example, as illustrated in FIG. 4C, employing the extraction process step, security analyzer engine 202 extracted http://host/webapp.cgi?name=ActualValue 406, from the flash file "flash_movie.swf". In this example, the path parameter http://host/webapp.cgi? and associated data parameter "ActualValue" were embedded in flash_movie.swf. In this illustration, the data parameter "ActualValue" represents a plurality of application data entry parameters, symbols, algorithms, etc. that are provided by, for example, the company that generated flash_movie.swf. In one embodiment, security analyzer engine 202 marks the data entry parameter "ActualValue" as a data entry point that may be stored, for example, in security tests data structure 206.

In other embodiments, for non-standard URL structures, security analyzer engine 202 may employ a deterministic approach to locate data input points. For example, security analyzer engine 202 may compare a set of URLs, examining where the URLs change on a byte-by-byte position basis. Changes in bytes with respect to given byte position between URLs may represent a data input point.

Figure 5A:
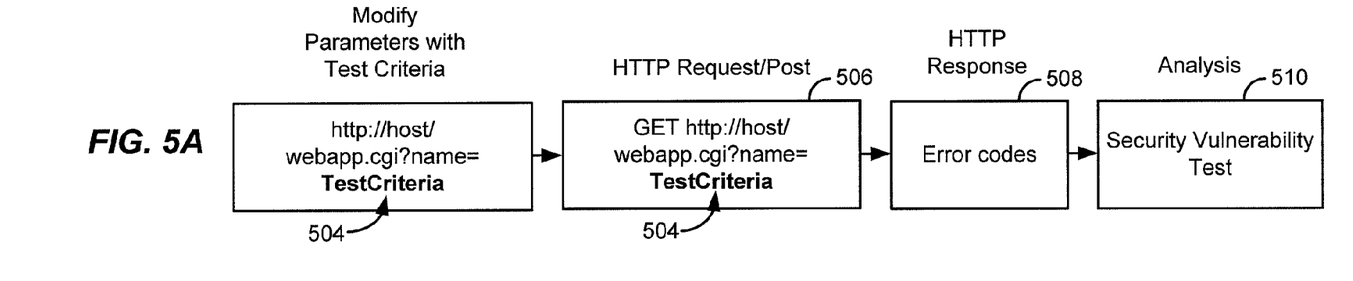
FIGS. 5A-C illustrate an example of a method of altering client requests using a pre-defined set of transformation criteria to generate web-application security tests and security vulnerability ranking in accordance with embodiments of the invention.
Figure 5B:
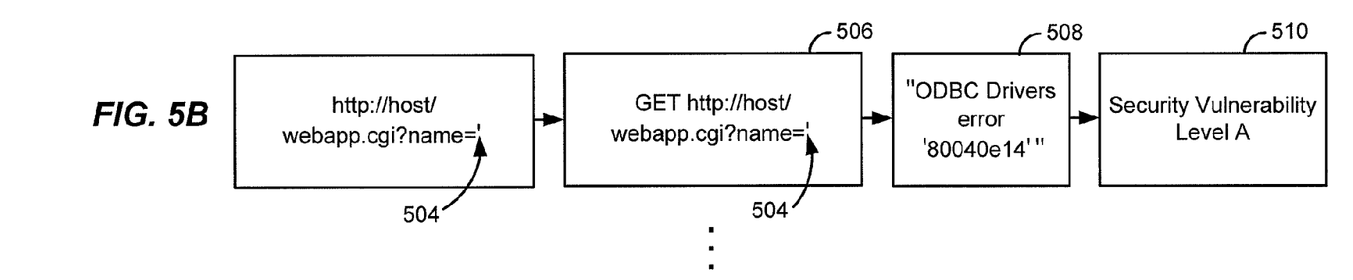
Figure 5C:
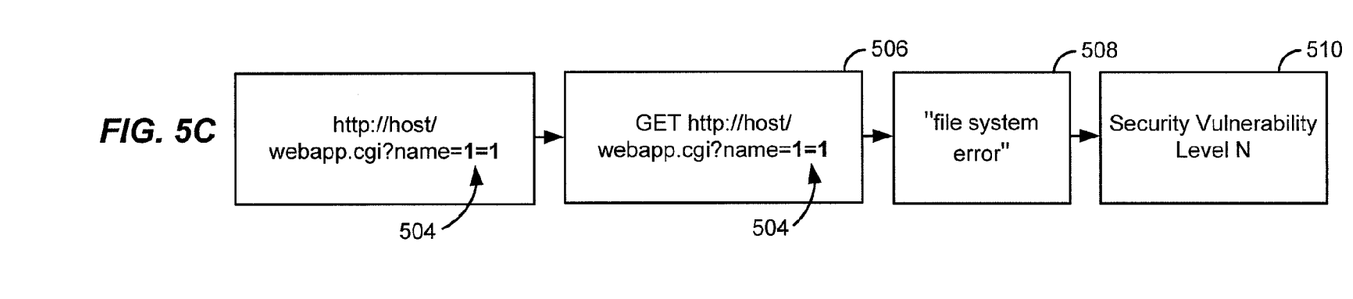

At step 312, security analyzer engine 202 generates modified data entry parameters by replacing the ones discovered during the parsing step with user-defined transformation criteria. Such user-defined transformation criteria may be derived from virtually any source and may be formed from alphanumeric characters, symbols, algorithms, binary strings, and the like, with respect to the type of path parameters and client-side applications being analyzed. For example, as illustrated in FIG. 5A, transformation criteria may be represented by the term "TestCriteria" which can take on a plurality of attributes with respect to common gateway interface (CGI) web-application "webapp.cgi" (CGI is a standard for interfacing external applications with information servers, such as HTTP or web servers). In one example, as shown in FIG. 5B, TestCriteria is an apostrophe (') character. In another example, as shown in FIG. 5C, TestCriteria is an algorithm "1=1".

In one embodiment, security analyzer engine 202 retrieves predetermined transformation criteria from transformation criteria data structure 204. Such predetermined transformation criteria may be derived empirically from user observations of responses from the web server 130 with respect to known web server responses and user observed responses that may lead the user to deduce a security vulnerability. For example, a user may rely on a string such as "SH1214!SGS#&" that is known to produce an error message, such as "DNS Error", from web servers most of the time.

A user may develop other transformation criteria that produces unexpected results recognized by the user but not necessarily recognized by others. In one embodiment, the user may develop predefined text field parameters, numeric filed parameters, database parameters (e.g., SQL, etc.), parameter names, and additional path parameters, configured to invoke a known server response or a server response recognized by the user but not necessarily recognized by others. The predetermined transformation criteria may be stored in, for example, security tests data structure 206.

At step 314, security analyzer engine 202 transmits the transformation criteria to its respective web server according to the path parameters. For example, as illustrated in FIG. 5A a request 506 containing the data parameter "TestCriteria" 504 is transmitted to a web server called "host". As shown in FIGS. 5B and 5C, the data parameter for "TestCriteria" 504 is an apostrophe and an algorithm 1=1, respectively, sent to the "host" web server. Security analyzer engine 202 is configured to transmit the transformation criteria any number of ways. For example, the transformation criteria may be sent as an HTTP request, such as GET or POST as known in the art.

At step 316, security analyzer engine 202 receives responses, or no responses, from the web servers (e.g., web server 130A-N). As described herein, the responses, or lack thereof, may be known, unexpected, or known to a user of the security analyzer engine 202. Security analyzer engine 202 stores the responses in results data structure 210 and examines the responses, or lack thereof, from the web servers responding to the transformation criteria to determine if any security vulnerabilities exist.

In one embodiment, the security analyzer engine 202 compares the responses received to a list of responses and associated security vulnerabilities stored, for example, in security test data structure 206. For example, as illustrated in FIG. 5A, an analysis process provides a rank of security vulnerability test 510. As illustrated at FIG. 5B, a web server provides a response 508 of "ODBC Drivers error '80040e14" in response to the modified transformation criteria of "name='" where the modified data parameter sent was an apostrophe ('). Security analyzer engine 202 compares the response "ODBC Drivers error '80040e14" 508 to a list of responses and corresponding security vulnerabilities that are well known or defined by the user, and provides a risk analysis 510 of "Level A". As illustrated at FIG. 5C, a web server provides a response 508 of "file system error" in response to the modified transformation criteria of "name=1=1", where the modified data parameter sent was the algorithm "1=1". Security analyzer engine 202 compares the response "file system error" 508 to a list of responses and corresponding security vulnerabilities and provides a risk analysis 510 of "Level B", for example, where "B" may be indicative of a greater security risk than level "A". Security analyzer engine 202 may compile the risk analyses to form a risk security vulnerability assessment. Security analyzer engine 202 ends the method 300 at step 318.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for analyzing security vulnerabilities in web-based applications, the method comprising:

executing one or more client-side applications in a monitored environment at a client, wherein at least one of the client-side applications is written such that not all entry points to the web-based applications being analyzed for security vulnerabilities are determinable from a scan of application code of the at least one client side application provided to the client, wherein the monitored environment isolates at least a part of the at least one of the client-side applications from the web-based applications;

extracting path parameters and data parameters, using tools of the monitored environment, from the one or more client-side applications wherein the path parameters and data parameters refer to web servers servicing the one or more client-side applications;

modifying the path parameters or data parameters with user-defined data to generate test data;

transmitting the test data to the web servers; and determining if any responses received in response to the test data are indicative of security vulnerabilities in the web-based applications being analyzed for security vulnerabilities.

2. The method of claim 1, further comprising parsing web page content to determine locations to client-side applications.

3. The method of claim 1, wherein extracting comprises searching for one or more web application URLs contained within a compiled client-side software application or file associated with the client-side software application.

4. The method of claim 1, wherein transmitting the test data comprises generating HTTP requests for transmission to at least some of the web servers.

5. The method of claim 1, wherein extracting the web addresses comprises simulating the execution process of a client-side application and capturing remote connection attempts to one or more of the web servers.

6. The method of claim 1, wherein determining comprises transmitting an HTTP request derived from at least some of the path parameters and receiving responses from the servers in response to the HTTP request.

7. The method of claim 1, wherein determining comprises searching a database of web server messages and associated security vulnerabilities.

8. A method of detecting security vulnerabilities in web-based applications, the method comprising:

executing one or more client-side applications in a monitored environment at a client, wherein at least one of the client-side applications is written such that not all entry points to the web-based applications being analyzed for security vulnerabilities are determinable from a scan of application code of the at least one client side application provided to the client, wherein the monitored environment isolates at least a part of the at least one of the client-side applications from the web-based applications;

extracting data from the one or more client-side applications, using tools of the monitored environment, to locate data entry points to web servers used to service the one or more client-side applications; and applying user-defined test criteria to the data entry points, wherein the user-defined testing data is configured to cause a web server to respond with one or more predetermined responses configured to expose security vulnerabilities in client-server interfaces associated with the data entry points.

9. The method of claim 8, further comprising parsing webpage content to locate the data entry points.

10. The method of claim 8, wherein extracting data comprises parsing a client-side application file to extract the data.

11. The method of claim 8, wherein extracting data comprises operating the client-side application and monitoring the communication between the client-side application and a web server used to service the client-side application.

12. The method of claim 8, wherein extracting data comprises monitoring changes in data parameter byte positions with respect to a plurality of URLs.

13. A computer-implemented security analyzer for detecting security vulnerabilities in client-server interfaces, the security analyzer comprising:
- a program code monitor that is at least partially implemented in the form of control logic in hardware and is configured to initiate execution of one or more client-side applications and monitor its execution in a monitored environment, wherein at least one of the client-side applications is written such that not all entry points to the client-server interfaces being analyzed for security vulnerabilities are determinable from a scan of application code of the at least one client-side application provided to the client, wherein the monitored environment isolates at least a part of the at least one of the client-side applications from the client-side interfaces;
- a security analyzer engine that is at least partially implemented in the form of control logic in hardware and is configured to extract client-server interface data from the monitoring of execution of the one or more client-side applications, and to generate user-defined testing data from the client-server interface data, wherein the user-defined testing data is configured to cause a web server to respond with one or more predetermined responses that are used to expose security vulnerabilities in client-server interfaces associated with the one or more client-side applications.

14. The security analyzer of claim 13, wherein the security analyzer engine is configured to extract the location of the client-side application from webpage content.

15. The security analyzer of claim 13, wherein the security analyzer engine analyzes the one or more client-side applications to determine one or more addresses of web-servers used to service the one or more client-side applications.

16. The security analyzer of claim 13, wherein the security analyzer engine is configured to parse the one or more client-side applications for path parameters or data parameters.

17. The security analyzer of claim 16, wherein the path parameters comprise URLs.

18. The security analyzer of claim 13, wherein the security analyzer engine is configured to monitor changes in data parameter byte positions with respect to a plurality of URLs.

19. The security analyzer of claim 13, wherein the security analyzer engine is configured to monitor client-server communication of at least one client-side application.

20. The security analyzer of claim 13, wherein the user-defined testing data comprises user-defined transformation criteria specifically named or selected by a user.

21. The security analyzer of claim 13, wherein the security analyzer engine replaces extracted path parameters or data parameters with user-defined testing criteria configured to invoke a response from a web server indicative of one or more security vulnerabilities.

22. The security analyzer of claim 21, wherein the user-defined testing criteria comprises a string of alphanumeric characters, or an algorithm, or symbol.

23. The security analyzer of claim 21, wherein the user-defined testing criteria comprises transformation criteria that produces unexpected results recognized by the user as one or more potential security vulnerabilities.

24. The security analyzer of claim 13, wherein the interface data comprises forms, or fixed fields, or hidden fields, or menu options.

\* \* \* \* \*